(12) United States Patent
Rechain et al.

(10) Patent No.: US 9,885,289 B2
(45) Date of Patent: Feb. 6, 2018

(54) AIRCRAFT PROPULSION ARCHITECTURE INTEGRATING AN ENERGY RECOVERY SYSTEM

(75) Inventors: Bruno Rechain, Paris (FR); Hichem Smaoui, Paris (FR); Emmanuel Joubert, Issy les Moulineaux (FR); Gilles Bezes, Lancon de Provence (FR); Matthieu Sautreuil, Salon de Provence (FR)

(73) Assignee: AIRBUS, Blagnac (FR)

( * ) Notice: Subject to any disclaimer, the term of this patent is extended or adjusted under 35 U.S.C. 154(b) by 998 days.

(21) Appl. No.: 14/236,621

(22) PCT Filed: Aug. 3, 2012

(86) PCT No.: PCT/EP2012/065221
§ 371 (c)(1),
(2), (4) Date: Apr. 28, 2014

(87) PCT Pub. No.: WO2013/017680
PCT Pub. Date: Feb. 7, 2013

(65) Prior Publication Data
US 2014/0290208 A1 Oct. 2, 2014

(30) Foreign Application Priority Data
Aug. 3, 2011 (FR) ..................... 11 57122

(51) Int. Cl.
| F02C 9/16 | (2006.01) |
| B64C 27/04 | (2006.01) |
| B64C 27/82 | (2006.01) |
| B64D 27/02 | (2006.01) |

(52) U.S. Cl.
CPC ............ *F02C 9/16* (2013.01); *B64C 27/04* (2013.01); *B64C 2027/8209* (2013.01); *B64D 2027/026* (2013.01); *Y02T 50/64* (2013.01)

(58) Field of Classification Search
CPC .................................. F02C 9/16; B64C 27/04
See application file for complete search history.

(56) References Cited

U.S. PATENT DOCUMENTS

| 8,757,542 B2 * | 6/2014 | Hopdjanian | B60L 3/0046 244/53 R |
| 2009/0159110 A1* | 6/2009 | Kwok | F02C 6/18 136/205 |
| 2010/0013223 A1 | 1/2010 | Certain | |
| 2010/0077741 A1 | 4/2010 | Samuel | |
| 2010/0126178 A1 | 5/2010 | Hyde et al. | |
| 2011/0121127 A1 | 5/2011 | Certain | |
| 2011/0179766 A1* | 7/2011 | Fonseca | B64D 33/04 60/204 |

FOREIGN PATENT DOCUMENTS

| DE | 202008002249 U1 | 4/2008 |
| EP | 1326017 A1 | 7/2003 |
| EP | 2148066 A1 | 1/2010 |
| EP | 2327625 A1 | 6/2011 |

* cited by examiner

*Primary Examiner* — Philip J Bonzell
*Assistant Examiner* — Michael B Kreiner
(74) *Attorney, Agent, or Firm* — Im IP Law; C. Andrew Im

(57) ABSTRACT

A drive system of at least one rotor of an aircraft via electrical energy in addition to or as a replacement of a mechanical system. The electrical energy is provided at least in part by at least one device for recovering thermal energy from hot gases of an internal combustion engine of the aircraft.

23 Claims, 2 Drawing Sheets

AIRCRAFT PROPULSION ARCHITECTURE INTEGRATING AN ENERGY RECOVERY SYSTEM

RELATED APPLICATIONS

This application is a §371 application from PCT/EP2012/065221 filed Aug. 3, 2012, which claims priority from French Patent Application No. 1157122 filed Aug. 3, 2011, each of which is herein incorporated by reference in its entirety.

TECHNICAL FIELD OF THE INVENTION

The present invention relates to a propulsion architecture for an aircraft such as a rotorcraft or rotary wing aircraft such as a helicopter incorporating an energy recuperation system.

BACKGROUND OF THE INVENTION

The aeronautical sector is one historically marked by continuous demands for innovation and technological progress. The search to reduce the environmental impact of air transport, emissions of greenhouse gases and noise, naturally falls within this remit.

Rotary wing aircraft are known for their high greenhouse gas emissions per passenger per kilometer.

Future regulations will dictate compliance with increasingly low emission levels which is why there is a need to improve the efficiency of the propulsion system in order to reduce pollutant emissions.

As far as optimizing the propulsive part of helicopters is concerned, projects connected with improving the efficiency of the turbine engines have allowed certain performance improvements. Other projects connected with hybridizing the helicopter by considering various architectures means that additional improvements can be envisioned.

However, the electrical energy used for hybridizing is generally stored in batteries the weight of which penalizes the fuel consumption and available payload.

As far as the auxiliary circuits, electric circuits, hydraulic circuits and/or pneumatic circuits are concerned, energy is tapped off the auxiliary gearbox or the main transition gearbox (MGB) which means that fuel is consumed in order to power these systems.

Energy recuperation is, at the present time, very well developed for stationary applications such as cogeneration.

In the scope of hybrid helicopter projects, mechanical/electric hybrid rotor designs or even all-electrical rotor designs show a great deal of promise. These are architectures in which the mechanical power required is supplied in full or in part by an electric motor.

OBJECT AND SUMMARY OF THE INVENTION

The present invention deals with the recuperation of thermal energy, its use and its conversion into electrical energy.

The present invention particularly proposes an aircraft provided with at least one propulsion turbine and comprising an electrical power system for powering at least one item of equipment, for which the electrical power system comprises a thermal energy recuperation device installed on the turbine, operating using the energy contained in the exhaust gases of the turbine as its hot source and using a fluid such as the ambient air, the engine oil, the fuel or some other turbine cooling fluid as its cold source.

According to a first embodiment, the energy recuperation device comprises:
- an evaporator that allows some of the thermal energy contained in the hot source to be transferred to a working fluid, this evaporator being installed at a nozzle of the turbine;
- a conversion machine for converting a thermal energy of the working fluid into a mechanical energy;
- an electric generator powered by the conversion machine;
- a condenser allowing the working fluid leaving the conversion machine to be condensed by exchange of heat with the cold source;
- a pump for compressing the working fluid leaving the condenser and circulating it through the evaporator;
- a control system, making it possible to adjust the power produced to the desired power, for example by controlling the throughput and/or pressure of the pump.

According to a second embodiment, the energy recuperation device comprises:
- an evaporator, installed on the outlet side of the turbine, allowing some of the thermal energy contained in the hot source to be transferred to a working gas, notably the air;
- a conversion machine converting a thermal energy of the working gas into a mechanical energy;
- an electric generator powered by the conversion machine;
- a compressor and its associated control system, bleeding ambient air and compressing it upstream of the evaporator.

According to a third embodiment, the energy recuperation device comprises a set of thermoelectric cells that convert the heat from a turbine nozzle directly into electricity.

The device advantageously comprises a power electronics system incorporated downstream of the generator of the energy recuperation system, the power electronics system performing one or more of the following functions:
- operating at the maximum power point available at the recuperation system, for example by incorporating a function usually referred to as "Maximum Power Point Tracking";
- contributing to regulating the voltage, thus contributing to the quality of the electrical energy;
- shaping the electrical energy output from the generator so that it can be used by the load(s) or the distribution system supplied, for example the nominal voltage generated by the power electronics will be 115Vac/400 Hz, 28Vdc, 270Vdc, 540Vdc or some other;
- adapting the power setpoint given to the recuperation system to the power demanded by the load or loads supplied, this potentially involving a system of measurements/communications between the recuperation system, the power electronics and possibly the load(s) or the distribution network powered;
- protecting the recuperation system and its generator against overload, from possible undesirable load transients, specific protection for the generator (for example load shedding if the alternator becomes overheated).

According to one particular embodiment, the energy recuperation device preferably generates optional electrical power as a replacement for all or some of the generating machines powered by power take-offs from an MGB/engine auxiliaries gearbox.

According to an alternative or complementary embodiment, the energy recuperation device is dedicated to powering optional loads such as deicing/anti-icing system, air conditioning compressor or electrical heating system, the electric generation by the energy recuperation device specifically powering an optional item of equipment or a set of optional equipment items.

According to an alternative, the energy recuperation device is connected to an electric power system provided with a reconfiguration system able to reconfigure itself in such a way that a main electric power supply bus of the aircraft can be powered by the energy recuperation device if the main generation is lost.

The energy recuperation device advantageously powers the main electrical network of the aircraft as a replacement for, or to supplement (running in parallel with) the generation powered by the power take-offs from the MGB or engine auxiliaries gearbox.

Alternatively, the energy recuperation device powers an independent electrical bus, to supplement the main busbars powered by the MGB sources, thus creating an additional source independent of the others.

According to one particular embodiment, the energy recuperation device furthermore powers hydraulic and/or mechanical/pneumatic auxiliaries.

According to one particular embodiment, the aircraft of the invention is a helicopter having a main rotor and a tail rotor.

The energy recuperation device advantageously in this case constitutes a hybridizing system for the main rotor and/or tail rotor, the electric generation of the energy recuperation device being associated, as a replacement for, or to supplement them, with the batteries used for hybridization, and placed in series or in parallel therewith.

A power electronics system incorporated downstream of the generator of the energy recuperation device advantageously manages the placing of the recuperation generator in parallel with at at least one main generator of the aircraft if need be.

The present invention further proposes a system for driving at least one rotor of an aircraft using electrical energy to supplement, or as a replacement for, a mechanical system, for which the electrical energy is supplied at least in part by at least one device for recuperating the thermal energy derived from the hot gases of an internal combustion engine of the aircraft.

Advantageously, the thermal energy recuperation device comprises a thermodynamic machine using a thermodynamic cycle between a hot source, the exhaust gases of the internal combustion engine, and a cold source, the ambient air.

The thermodynamic machine preferably comprises a first exchanger on the hot source, a second exchanger on the cold source, a heat transfer fluid circulating between the first and the second exchangers, and a conversion unit that converts thermal energy into mechanical energy between the exchangers.

Advantageously, the recuperation device comprises an electrical generator machine that provides mechanical/electrical conversion and is coupled to said conversion unit.

According to one advantageous embodiment, the recuperation device powers all or some of the auxiliary circuits such as the electrical circuits, hydraulic circuits or pneumatic circuits of the aircraft.

Because the recuperated energy powers all or some of the auxiliary circuits such as the electrical, hydraulic or pneumatic circuits, taking off power from the auxiliary gearbox and MGB will thus be eliminated or reduced.

The recuperation device advantageously comprises a mechanical/pneumatic conversion device for powering the pneumatic circuits of the aircraft and/or a mechanical/hydraulic conversion device for powering the hydraulic circuits of the aircraft.

According to one particular embodiment, the hot gases are the exhaust gases from at least one propulsion piston engine of the aircraft.

In this case, the first exchanger is advantageously coupled to an exhaust pipe of the piston engine.

According to an alternative embodiment, the hot gases are the gases generated by at least one propulsion turbine of the aircraft.

In this case, the first exchanger is advantageously arranged in an outlet nozzle of the turbine.

The rotor is advantageously a rotary wing aircraft rotor, and in particular a helicopter tail rotor.

BRIEF DESCRIPTION OF THE DRAWINGS

Other features and advantages of the invention will become apparent from reading the following description of a nonlimiting embodiment of the invention accompanied by the attached drawings which depict.

DETAILED DESCRIPTION OF THE EMBODIMENTS

Figure 1:
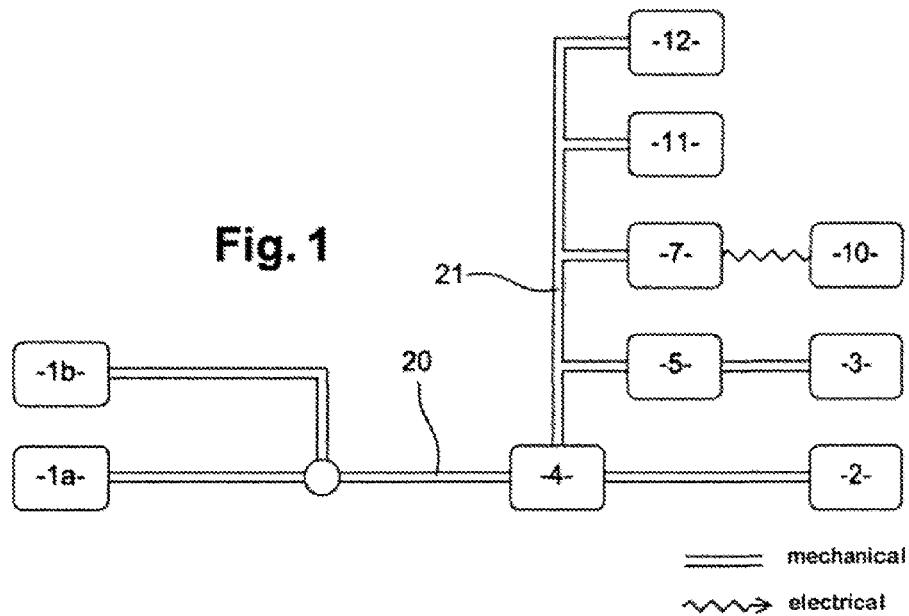
in FIG. 1: a diagram of a conventional architecture of a rotary wing aircraft propulsion system.

The proposed system is able to produce electrical energy from the thermal energy of the exhaust gases of an internal combustion engine of an aircraft and, in particular, of a helicopter, in order partially or completely to power electrical systems and/or the hybrid electric or all electric propulsion main and/or tail rotors.

The energy recuperation systems installed on the aircraft work thanks to the presence of a hot source, the energy contained in the turbine exhaust gases, and a cold source, for example the ambient air, the engine oil, the fuel or any other cooling liquid. The system for converting heat losses into energy, for example electrical energy, notably comprises:

an evaporator that allows some of the thermal energy contained in the hot source (exhaust gases) to be transferred to a working fluid, this evaporator being installed at the nozzle;

a turbine or any other machine, for example a piston machine, allowing thermal energy to be converted into mechanical energy;

an electric generator powered by the above machine;

a condenser allowing the working fluid leaving the turbine to be condensed by exchange of heat with the cold source;

a pump for compressing the working fluid leaving the condenser and circulating it through the evaporator;

a control system, making it possible to adjust the power produced to the desired power, for example by controlling the throughput/pressure of the pump.

There are other solutions for systems for recuperating heat losses: an alternative is the use of a system comprising:

a heat exchanger, allowing some of the thermal energy contained in the hot source (exhaust gases) to be transferred to a working gas, for example air. This evaporator is installed on the outlet side of the turbine;

a turbine or any other machine allowing thermal energy to be converted into mechanical energy;

an electric generator powered by the above machine;

a compressor, bleeding ambient air and compressing it upstream of the evaporator, and its associated control system.

Another alternative is the use of a set of thermoelectric cells.

Whatever the target application, powering a hybridizing system or powering the on-board electrical network, a power electronics system will possibly be incorporated downstream of the generator of the energy recuperation system. It performs one or more of the following functions:

operating at the maximum power point available at the recuperation system, for example by incorporating a function usually referred to as "Maximum Power Point Tracking";

contributing to regulating the voltage, thus contributing to the quality of the electrical energy;

shaping the electrical energy output from the generator so that it can be used by the load(s) or the distribution system supplied, for example the nominal voltage generated by the power electronics will be 115Vac/400 Hz, 28Vdc, 270Vdc, 540Vdc or some other;

adapting the power setpoint given to the recuperation system to the power demanded by the load or loads supplied, this possibly involving a system of measurements/communications between the recuperation system, the power electronics and possibly the load(s) or the distribution network powered;

protecting the recuperation system and its generator against overload, from possible undesirable load transients, specific protection for the generator (for example load shedding if the alternator becomes overheated);

managing the placing in parallel of the recuperation generator with respect to the main generator(s), if appropriate.

In what follows, the assembly made up of the recuperation system, and any power electronics converter it may have associated with one or more of the abovementioned functions are referred to as "electric generation of the energy recuperation system".

As far as powering the on-board electrical circuits (excluding the hybridizing system) is concerned, there are three envisioned architectures.

In a first architecture, generation of optional power, for example all or some of the generator machines usually powered by power take-off from the MGB/engine auxiliaries gearbox, is replaced by the electric generation of the energy recuperation system. The latter may be dedicated to powering optional loads, for example the deicing/anti-icing system, an air conditioning compressor or even an electric heating system. In this case, the electric generation of the energy recuperation system specifically powers an optional item of equipment or a set of optional equipment items. If the main generation is lost, the system may potentially reconfigure itself to power the main busbar, thanks to a reconfiguration device. This architecture has the twofold advantage of reducing the power taken off from the MGB/engine auxiliaries gearbox—and therefore of reducing fuel consumption—and of improving the availability of energy in the event of a fault.

In a second architecture, the electric generation of the energy recuperation system powers the main network as a replacement for, or to supplement (placed in parallel), the generation powered by power take-offs from the MGB or the engine auxiliaries gearbox, making it possible to reduce the specific consumption of the engine. The dimensioning of the generating machine powered by the MBG/engine auxiliaries gearbox will therefore be lower by comparison with the situation in which recuperation generation is not installed.

A third solution is for the electric generation of the recuperation system to power an independent essential bus that supplements the main and essential busbars powered by the MGB sources, thus creating an additional source independent of the others.

This power supply structure allows a significant improvement in the operational reliability but above all in the safety of the electrical system thus allowing the installation of loads having a significant number of independent sources, particularly for the electric flight actuators.

Aside from powering auxiliary electrical systems, another possible use is the powering of hydraulic auxiliaries (hydraulic pump for example) or mechanical/pneumatic auxiliaries (for example air conditioning compressor).

As far as powering the main rotor and/or tail rotor hybridization system is concerned, the electric generation of the recuperation system is associated, as a replacement for or to supplement them, with the batteries used for hybridizing and placed in series or in parallel therewith.

Whatever the chosen use, the principle of operation of the energy recuperation systems entails the removal of heat energy from the recuperation system using a heat exchanger.

This energy is usually discharged into the atmosphere but one option is to recuperate all or some of this energy to heat up the air (for example the cabin—the heating system), the fuel or any other part or component of the aircraft.

The diagram of FIG. 1 depicts a traditional architecture of a twin-engine helicopter with a main rotor and a tail rotor in which the two internal combustion engines 1a, 1b, which are piston engines or turbine engines, drive a main gearbox 4 referred to as MGB via a primary mechanical connection 20 such as a transmission shaft.

The MGB 4 distributes mechanical power through a secondary mechanical connection 21 to a main rotor 2, a tail rotor gearbox 5 for mechanically driving a tail rotor 3, an electric generator machine 7, a hydraulic pressure generator 11 and a pneumatic pressure generator 12.

In this diagram, the electrical power delivered by the generating machine 7 is distributed by an electrical distribution network 10 powering the various electrical components of the helicopter.

Figure 2:
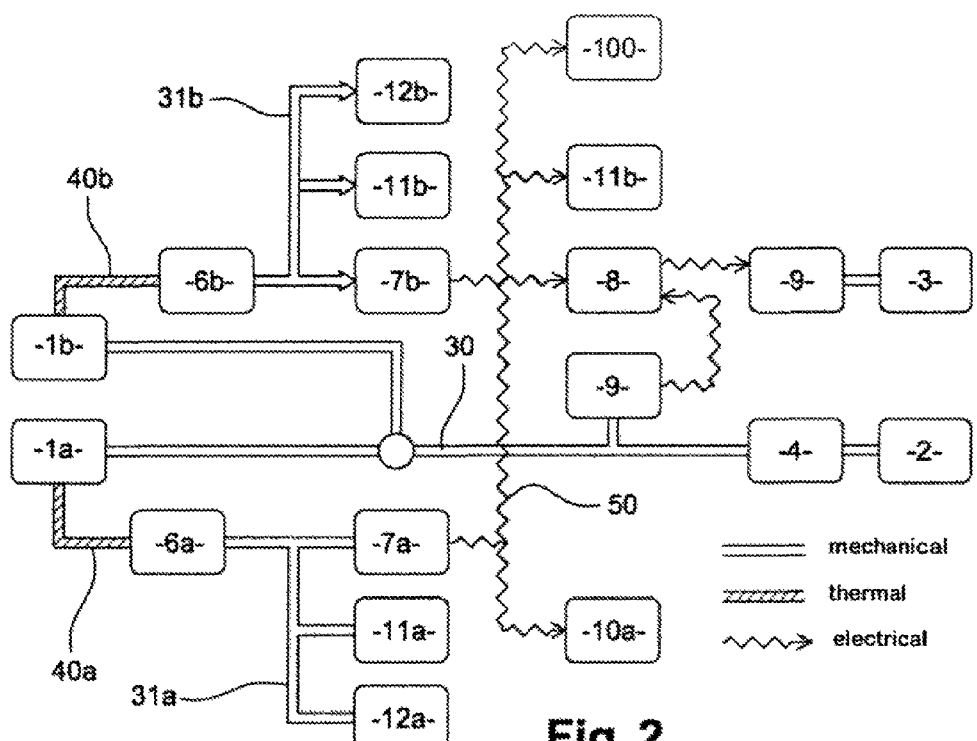
in FIG. 2: a diagram of an architecture of an aircraft propulsion system according to the invention.

The diagram of FIG. 2 corresponds to a twin-engine helicopter architecture with a main rotor and a tail rotor comprising the system of the invention.

As in the diagram of FIG. 1, the internal combustion engines 1a, 1b distribute mechanical power to an MGB 4 which, in the example, drives the main rotor 2.

By contrast, according to the invention, thermal energy recuperation devices 6a, 6b are powered by heat tappings 40a, 40b at the hot gas outlets of the engines 1a, 1b.

Figure 4:
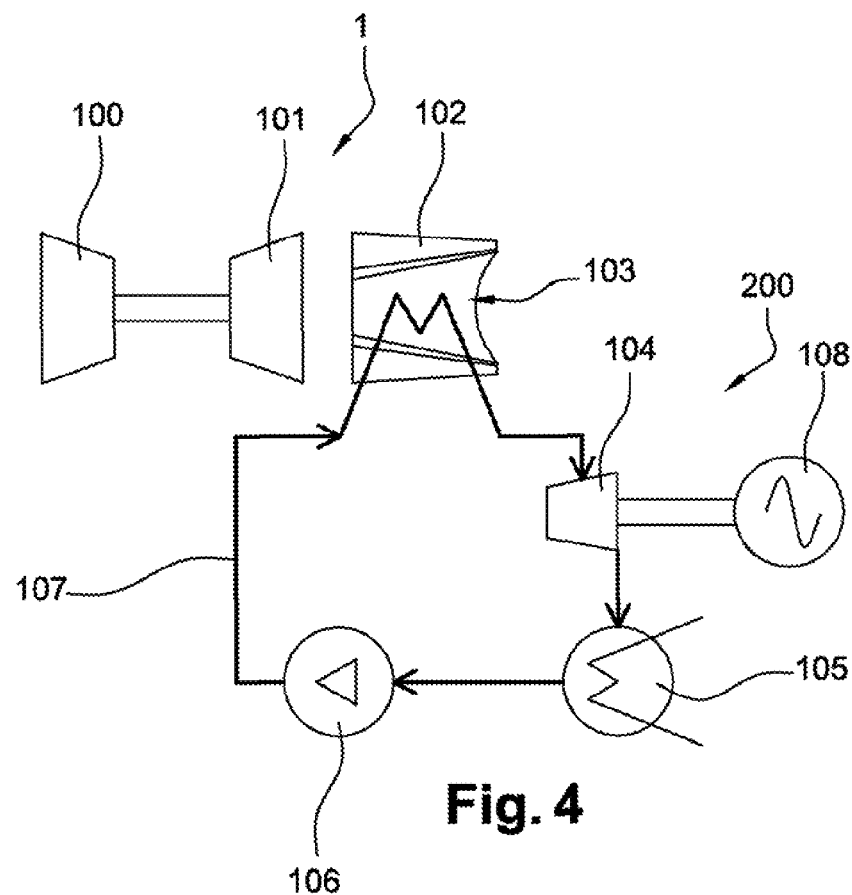
in FIG. 4: a diagram of the incorporation of a thermal energy recuperation system according to the invention.

The thermal energy recuperation devices 6a, 6b are, for example, turbines 104 according to FIG. 4, the heat tappings being heat exchangers 103 in this same figure.

Coming back to FIG. 2, the recuperated energy is used to power the electric generator machines 7a, 7b, the hydraulic pressure generators 11a, 11b and the pneumatic pressure generators 12a, 12b.

It is of course possible for the system of the invention to power only the electric generator machines.

It should be noted that, in the case of a twin-engine aircraft like the one depicted, comprising internal combustion piston engines or turbine engines, it is possible to associate a recuperation device on a first of the internal combustion engines with an electric generating machine, and the other of the internal combustion engines with the pressure generators 11, 12 or any other arrangement while remaining within the scope of the invention.

The electric generator machine or machines 7a, 7b will power an electrical network 50 powering the electric distribution networks 10a, 10b and power electronics 8 that control an electric motor 9 that drives the helicopter tail rotor 3.

In order to increase the power supplied to the tail rotor or to the system according to the flight configurations, an electric motor 9 coupled to the main shaft 30 is connected to the power electronics 8 to power these if the recuperated thermal power proves insufficient.

Thus, the system of the invention here achieves thermal/electric hybrid propulsion of the helicopter and can also, if sufficient power is recuperated, power auxiliary circuits of the aircraft and notably the electrical network, the pneumatic circuit, for example the air conditioning compressors and/or the hydraulic circuit, for example hydraulic pumps.

The energy recuperation system describes a thermodynamic cycle between a hot source, the exhaust gases from the internal combustion engine, and a cold source, the ambient air.

It notably comprises, at the thermal energy recuperator or recuperators 6a, 6b, a driving element or a turbine, steam turbine, Stirling engine or other engine referred to as an external combustion engine, coupled to a generating machine 7a, 7b that performs mechanical/electrical conversion.

An alternative sees the driving element replaced by a thermoelectric generator.

The system also includes a mechanical/hydraulic conversion system 11a, 11b and a mechanical/pneumatic conversion system 12a, 12b so that all or some of the auxiliary circuits can be powered.

This solution allows a significant increase in the energy efficiency of the drive train by realizing the potential of the heat discharged from the internal combustion engine or engines.

Coupling the thermal/electrical energy converter to an electric motor 9 of the tail rotor 3 provides greater flexibility in terms of rotational speeds compared with fitting it mechanically directly to the gearbox 5 of the earlier architecture. The new architecture allowed by the invention also allows a reduction in the mass of the batteries 100 that have to be carried on board because the electric motors are powered at least in part directly by the heat recuperation system.

In addition, the elimination of the tapping of energy to operate the auxiliary circuits from the auxiliary gearbox referred to as MGB also contributes to the reduction in aircraft fuel consumption.

It should be noted that it is still possible within the context of the invention to operate all or some of the auxiliary circuits apart from the tail rotor using the MGB, for example in the case of a single-engine helicopter for which the power that can be recuperated from the exhaust gases would be too limited.

Finally, the heat exchanger between the exhaust gases hot source and the cold source ambient air cold source can be used for a secondary function, that of heating up the ambient air and thus supplying the cabin with hot air. There is thus no longer any need to bleed hot air from the turbine engine as it leaves the compressor, as there was in a conventional turbine engine architecture, thus making it possible to improve turbine efficiency.

The solution is based on the incorporation of a system for recuperating heat/converting heat into electrical energy, with a machine on a thermodynamic cycle coupled to a generating machine in the nozzle of the turbine or the exhaust line.

This system includes three main assemblies:
  a first heat exchanger at the hot source, which exchanger is placed in the exhaust gas line of a piston engine or in the nozzle of a turbine of the aircraft, allowing some of the thermal energy of the exhaust gases to be recuperated,
  a second heat exchanger at the cold source, placed downstream of the conversion system and allowing the heat from the thermodynamic cycle to be removed, but also able to heat up the ambient air in order to supply the cabin with hot air thus making it possible to reduce the need to bleed air from the helicopter turbine and to improve its energy efficiency,
  a system for converting the thermal energy recuperated between the two exchangers into electrical energy.

In the case of an aircraft that has several turbines, there are two conceivable configurations.

In the first configuration, one heat exchanger system is installed per turbine and just one single system for converting the recuperated thermal energy into electrical energy is installed for the aircraft.

In the second configuration, a system for converting thermal energy into electrical energy is installed for each heat exchanger.

Figure 3:
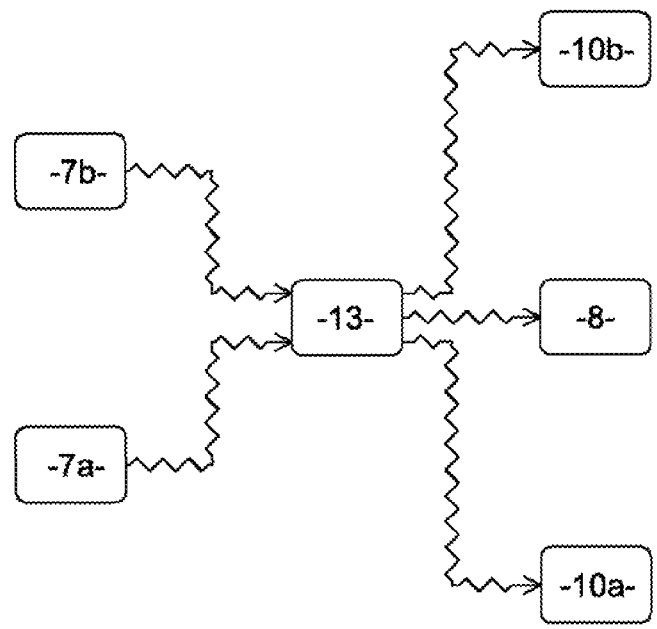
in FIG. 3: a detail of an electrical diagram of a device according to the invention.

FIG. 3 depicts an example of the electrical circuit of FIG. 1 in greater detail in which the generating machines 7a, 7b power a regulating and distribution device 13 comprising a computer that defines the control laws for enabling the correct distribution/allocation of power.

Ultimately, the recuperation system can be used to perform one or more of the following functions:
  for powering the main rotor, in which case the MGB 4 will power a generator similar to the generator 9 interposed between the MGB and an electric motor for driving the main rotor,
  for powering the tail rotor as described in the example of FIG. 2;
  for powering the electrical/pneumatic/hydraulic networks, again according to the example of FIG. 2.

The recuperation system will power an electrical network distributed at a voltage of 270Vdc, 115Vac/200Vac, 28Vdc or any other desired AC or DC voltage level.

If the amount of power produced by the recuperation system is not enough to power one of the rotors, an electric generator 9 may be coupled to the original gearbox to supply the top-up power required according to the example of FIG. 2.

FIG. 4 depicts one possible diagram for how a thermal energy recuperation system can be incorporated into an internal combustion engine 1 of the turbine type comprising in the known way compressor stages 100, 101 and an outlet nozzle 102.

The thermal energy recuperation device comprises a thermodynamic machine 200 using a thermodynamic cycle between a hot source, the exhaust gases of the internal combustion engine, and a cold source, the ambient air.

The thermodynamic machine or closed cycle steam turbine, notably operating on the Rankine cycle, comprises a first exchanger 103, the hot exchanger, on the hot source, here the nozzle 102 of the internal combustion engine, a second exchanger 105 on the cold source, for example a radiator in contact with the exterior air passing over the aircraft, a heat transfer fluid circulating between the first and second exchangers via a circuit of tubes 107 and a unit that converts thermal energy into mechanical energy, here in the form of a turbine 104.

The thermodynamic machine further comprises a pump 106 that causes the fluid to circulate through the heat transfer fluid circuit 107.

The turbine 104 here drives an electric generator 108 which will be used as described hereinabove.

One advantage of the system of the invention is that it reduces the outlet temperature of the gases from the combustion engine of the aircraft thereby reducing its infrared signature.

The invention, which is not restricted to the example depicted which corresponds to a twin-engine craft, but which can notably be applied to a single-engine craft, applies particularly to helicopters or to rotary-wing drones and allows an improvement in the overall efficiency of the aircraft propulsion system, notably when the turbine or turbines of this craft are performing work rather than supplying thrust.

The invention claimed is:

1. An aircraft having a main rotor and a tail rotor, said aircraft being provided with at least one propulsion turbine and comprising an electrical power system to power at least one item of equipment, wherein said aircraft comprises a thermal energy recuperation device, installed on said at least one propulsion turbine, to generate electrical energy using thermal energy contained in exhaust gases of said at least one propulsion turbine as a hot source and using one of the following as a cold source: ambient air, engine oil, fuel or turbine cooling fluid and wherein said thermal energy recuperation device comprises a conversion machine including an electric generator, wherein said electric generator is connected to an electric power system of said aircraft provided with a reconfiguration system to reconfigure itself so that a main electric power supply bus of said aircraft is powered by said thermal energy recuperation device if a main generation is lost.

2. The aircraft as claimed in claim 1, wherein the conversion machine converts the thermal energy of a working fluid into mechanical energy; and wherein the thermal energy recuperation device comprises:
   an evaporator to transfer some of the thermal energy contained in the hot source to the working fluid, the evaporator being installed at a nozzle of said at least one propulsion turbine;
   a condenser to condense the working fluid leaving the conversion machine by exchanging heat with the cold source;
   a pump to compress the working fluid leaving the condenser and circulating it through the evaporator;
   a control system to adjust a power produced by the energy recuperation device by controlling at least one of throughput or pressure of the pump.

3. The aircraft as claimed in claim 1, wherein a working fluid is a working gas and wherein the thermal energy recuperation device comprises:
   an evaporator, installed on an outlet side of the turbine, to transfer some of the thermal energy contained in the hot source to the working gas;
   a conversion machine to convert the thermal energy of the working gas into mechanical energy;
   a compressor and its associated control system to bleed the working gas and to compress the working gas upstream of the evaporator.

4. The aircraft as claimed in claim 1, wherein the thermal energy recuperation device comprises a set of thermoelectric cells to convert heat from a turbine nozzle directly into electricity.

5. The aircraft as claimed in claim 1, further comprising a power electronics system incorporated downstream of the electric generator of the thermal energy recuperation device, the power electronics system is configured to operate at a maximum power point available at the energy recuperation device by incorporating a Maximum Power Point Tracking function, to regulate a voltage to control quality of the electrical energy, to shape the electrical energy output from the generator so that it can be used by one or more loads or a distribution system supplied, to adapt a power setpoint given to the thermal energy recuperation device to a power demanded by load or loads supplied, and to protect the thermal energy recuperation device and the electric generator against an overload.

6. The aircraft as claimed in claim 1, wherein the thermal energy recuperation device generates an optional electrical power as a replacement for all or some of generating machines powered by power take-offs from an MGB/engine auxiliaries gearbox.

7. The aircraft as claimed in claim 1, wherein the thermal energy recuperation device provides power to at least one of the following loads: a deicing/anti-icing system, an air conditioning compressor or an electrical heating system, the energy recuperation device generates the electrical energy to power an item of equipment or a set of equipment items.

8. The aircraft as claimed in claim 1, wherein the thermal energy recuperation device powers a main electrical network of the aircraft as a replacement for, or to supplement by running in parallel with, electrical energy generated by power take-offs from a MGB or an engine auxiliaries gearbox.

9. The aircraft as claimed in claim 8, wherein the thermal energy recuperation device powers at least one of hydraulic or mechanical/pneumatic auxiliaries.

10. The aircraft as claimed in claim 1, wherein the thermal energy recuperation device powers an independent electrical bus to supplement main busbars powered by MGB sources, thereby creating an additional independent power source.

11. The aircraft as claimed in claim 1, further comprising a power electronics system incorporated downstream of said electric generator of the thermal energy recuperation device to manage operation of the recuperation generator in parallel with at least one main generator of the aircraft.

12. The aircraft as claimed in claim 1, wherein the electrical energy generated by said thermal energy recuperation device being associated with batteries used for hybridization of said at least the main rotor or the tail rotor, and placed in series or in parallel therewith.

13. A system for driving at least one rotor of an aircraft using electrical energy to supplement, or as a replacement for, a mechanical system, comprising at least one energy recuperation device to recuperate thermal energy derived from hot gases of an internal combustion engine of the aircraft to supply at least part of the electrical energy to drive said at least one rotor; and wherein said at least one energy recuperation device comprises a thermodynamic machine using a thermodynamic cycle between exhaust gases of the internal combustion engine as a hot source and an ambient air as a cold source, and an electrical generator coupled to a conversion unit to provide a mechanical/electrical conversion, wherein said electric generator is connected to an electric power system of said aircraft provided with a reconfiguration system to reconfigure itself so that said at least one rotor of said aircraft is powered by said at least one energy recuperation device if the mechanical system is lost.

14. The drive system as claimed in claim 13, wherein the thermodynamic machine comprises a first exchanger on the hot source, a second exchanger on the cold source, and a heat transfer fluid circulating between the first and the second exchangers; and wherein the conversion unit converts the thermal energy into mechanical energy between the exchangers.

15. The drive system as claimed in claim 14, wherein the hot gases are exhaust gases from a propulsion piston engine of the aircraft.

16. The drive system as claimed in claim 15, wherein the first exchanger is coupled to an exhaust pipe of the propulsion piston engine.

17. The drive system as claimed in claim 14, wherein the hot gases are gases generated by a propulsion turbine of the aircraft.

18. The drive system as claimed in claim 17, wherein the first exchanger is arranged in an outlet nozzle of the propulsion turbine.

19. The drive system as claimed in claim 13, wherein the energy recuperation device powers all or some of the following auxiliary circuits: electrical circuits, hydraulic circuits or pneumatic circuits of the aircraft.

20. The drive system as claimed in claim 19, wherein the energy recuperation device comprises a mechanical/pneumatic conversion device to power the pneumatic circuits of the aircraft.

21. The drive system as claimed in claim 19, wherein the energy recuperation device comprises a mechanical/hydraulic conversion device to power the hydraulic circuits of the aircraft.

22. The drive system as claimed in claim 13, wherein said at least one rotor is a rotary wing aircraft rotor.

23. The drive system as claimed in claim 22, wherein said at least one rotor is a helicopter tail rotor.

* * * * *